US009375975B2

(12) United States Patent
Makau et al.

(10) Patent No.: US 9,375,975 B2
(45) Date of Patent: Jun. 28, 2016

(54) CANVAS WITH A TEXTURED APPEARANCE

(75) Inventors: Fredrick Muya Makau, San Diego, CA (US); Dheya M. Alfekri, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1111 days.

(21) Appl. No.: 13/033,406

(22) Filed: Feb. 23, 2011

(65) Prior Publication Data

US 2012/0213966 A1    Aug. 23, 2012

(51) Int. Cl.
*D06N 7/00*    (2006.01)
*D06N 7/04*    (2006.01)
*B44D 3/18*    (2006.01)
*B44F 11/02*   (2006.01)
*B32B 5/02*    (2006.01)
*B32B 27/12*   (2006.01)
*B32B 27/30*   (2006.01)

(52) U.S. Cl.
CPC . *B44D 3/18* (2013.01); *B32B 5/024* (2013.01); *B32B 27/12* (2013.01); *B32B 27/306* (2013.01); *B44F 11/02* (2013.01); *B32B 2262/0276* (2013.01); *B32B 2262/062* (2013.01); *B32B 2262/14* (2013.01); *B32B 2307/75* (2013.01); *Y10T 428/24364* (2015.01)

(58) Field of Classification Search
CPC ........................................................ B44D 3/18

USPC ........................................................ 428/142
See application file for complete search history.

(56) References Cited

U.S. PATENT DOCUMENTS

| 4,785,313 | A | * | 11/1988 | Higuma et al. | 347/105 |
| 6,153,305 | A | * | 11/2000 | Uemura et al. | 428/478.2 |
| 7,160,603 | B2 | * | 1/2007 | Carlson | 428/212 |
| 2003/0035917 | A1 | * | 2/2003 | Hyman | 428/67 |
| 2003/0228429 | A1 | * | 12/2003 | Ercoli et al. | 428/32.1 |
| 2005/0238826 | A1 | * | 10/2005 | Bi et al. | 428/32.24 |
| 2006/0147657 | A1 | | 7/2006 | Loeb | |
| 2007/0264477 | A1 | | 11/2007 | Iarca | |
| 2008/0254240 | A1 | * | 10/2008 | Niu et al. | 428/32.16 |

FOREIGN PATENT DOCUMENTS

JP    2002067599 A    3/2002
WO   WO2009091361    *   7/2009

* cited by examiner

*Primary Examiner* — Maria Veronica Ewald
*Assistant Examiner* — Tong Guo
(74) *Attorney, Agent, or Firm* — Fabian VanCott

(57) ABSTRACT

A canvas with a textured appearance includes a base layer, a gesso layer on the base layer, a microporous layer on the gesso layer, the microporous layer including uniform cracks formed according to a weave pattern of the base layer; and a transparent layer to fill the cracks. A method of forming a canvas with a textured appearance includes forming a base layer, forming a gesso layer on the base layer, forming a microporous layer on the gesso layer, the microporous layer comprising uniform cracks formed according to a weave pattern of the base layer, and forming a transparent layer to fill the cracks.

19 Claims, 5 Drawing Sheets

Table (200)

| Component | Parts |
|---|---|
| Pigment Mixture | 100 |
| Cross-Linker | Variable |
| PVA 235 | 21 |
| Glycerol | 2.0 |
| Silwet L7600 | 0.5 |

Table (210)

| Component | Parts |
|---|---|
| Mowiol 40-88 | 10.6 |
| Ecosurf SA-9 | .32 |
| Cartacoat K303C | 88.6 |
| Silwet L7605 | .2 |

CANVAS WITH A TEXTURED APPEARANCE

BACKGROUND

A canvas is a woven fabric that is commonly used as a painting medium. When used for traditional hand painting, the course nature of the fabric of the canvas provides a textured appearance to the image painted onto the canvas. When using printing devices to print an electronically stored image onto a canvas, the canvas should be smoothed out by a top coat using various techniques. Without this smoothing process, various print performance issues such as ink coalescence and ink bleed will arise. Furthermore, this smoothing process affects characteristics of the canvas including uniform feel, texture, and ease of handling. However, this smoothing process removes the aesthetically desired textured look of the canvas.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

The present specification discloses a method for forming a canvas that is suitable for printing while maintaining a textured appearance. According to certain illustrative examples, the canvas includes a base layer, a gesso layer, a microporous coating, and a transparent coating. The base layer includes the fabric which may be woven according to standard weave patterns associated with standard canvases. On top of the base layer, a gesso layer, which is made of a white chalky substance, is placed on top of the base layer. A microporous layer is then placed on top of the gesso layer. Based on the chemical properties of this microporous layer, cracks will form in the surface as it dries. These cracks will form along the interstitial regions corresponding to the weave pattern of the base layer. Thus, there will be a uniform cracking pattern across the surface of the canvas. A transparent coating layer is then used to fill the cracks. Filling the cracks with a transparent layer prevents bleeding and allows the cracks to still be viewed.

Through use of a canvas embodying principles described herein, an electronically stored image can be printed onto a canvas using traditional printing methods such as ink jet. Due to the uniform cracking along the interstitial regions, the printed image will have a textured appearance. This can be useful, for example, when printing electronic images of classical paintings. These paintings will be printed onto a canvas and a textured look may still be present.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included in at least that one example, but not necessarily in other examples.

Figure 1:
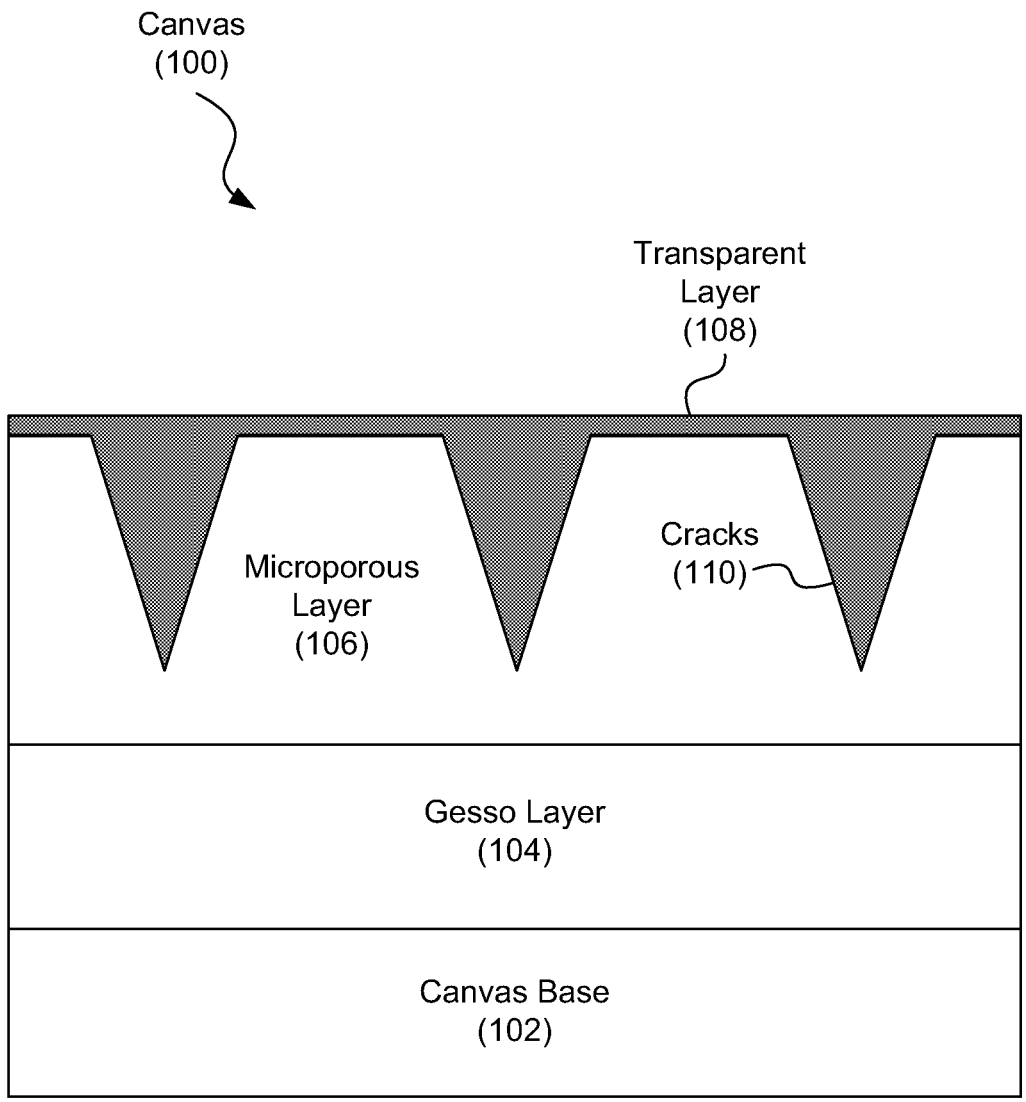
FIG. 1 is a diagram showing an illustrative cross sectional view of an illustrative canvas, according to one example of principles described herein.

Referring now to the figures, FIG. 1 is a diagram showing an illustrative cross sectional view of an illustrative canvas (100) with a textured appearance. According to certain illustrative examples, the canvas (100) includes a base (102), a gesso layer (104), a microporous layer (106), and a transparent layer (108).

The canvas base (102) is made of standard canvas material such as a cotton and polyester blend. This base may be woven in a standard canvas weave pattern such as a one by one weave or a two by one weave. Different weave patterns are used to achieve slightly different appearances in the texture of the canvas.

The gesso layer (104) is a paint mixture that includes a chalk substance and white pigments. The gesso layer (104) may include such materials as titanium dioxide or calcium carbonate. Gesso is often applied to canvases or other rigid surfaces in preparation for paint. Gesso has an absorbent characteristic that promotes quick drying of the ink placed onto the canvas. Additionally, the gesso provides stiffness and makes the canvas easier to handle during subsequent coating processes.

The microporous layer (106) is placed on top of the gesso layer (104). The microporous layer includes a coating that is designed to have a limited flexibility. The chemical makeup of the microporous layer is such that the applied microporous layer will be prone to cracking. The cracks (110) that will form throughout the microporous layer (106) will tend to follow the interstitial regions of the weave pattern of the base layer (102). Thus, a uniform cracking will be visible on the surface of the microporous layer (106). Furthermore, the chemical formation of the microporous layer may be adjusted to affect the nature of these cracks (110).

These cracks in the surface of the microporous layer can be problematic when ink is applied. Specifically, the cracks can cause ink bleeding. The transparent layer (108) is used to fill the cracks (110) in order to prevent bleeding of the ink that will be placed onto the canvas. Thus, although the top of the canvas is smooth, the cracks are still visible. When ink is placed on top of the transparent layer (108) to form an image on the canvas, the cracks below the layer of ink can affect the way that light is absorbed and reflected by that ink. Thus, a human eye may be able to detect a textured appearance in the image. This can give the aesthetic appearance of a traditionally painted image.

Figure 2A:
FIGS. 2A and 2B are tables showing the illustrative chemical makeup of materials to be used in a canvas with a textured appearance, according to one example of principles described herein.
Figure 2B:

FIGS. 2A and 2B are tables showing the illustrative chemical makeup of materials to be used in a canvas with a textured appearance. FIG. 2A is a table (200) showing an example of the chemical makeup to be used in a microporous layer (e.g. 106, FIG. 1). The left column (202) shows the chemical component and the right column (204) shows the parts ratio for the corresponding chemical component.

According to certain illustrative examples, the microporous material may include a base pigment mixture, a cross-linker material, polyvinyl alcohol, PVA (Poval 235), Glycerol, and Silwet L7600. The base pigment mixture is typically a white color. However, off-white or other colors may be used as well.

A cross-linker material is mixed in with the pigment. The parts range of the cross-linker material may vary. A typical parts range may be from 0.5 to 3 parts cross-linker for 100 parts pigment mixture. The cross-linker material affects the flexibility of the microporous material. A greater amount of the cross-linker material will lead to a higher flexibility of the microporous material. A smaller amount of the cross-linker material will lead to a lower flexibility of the microporous material. One example of a cross-linker material is boric acid.

The flexibility of the microporous material will affect the nature of the cracks that form in the microporous layer. A higher flexibility will lead to less cracking. Furthermore, a higher flexibility leads to more irregular cracks. Thus, by adjusting the amount of cross-linker material in the microporous material, the nature of the cracks can be adjusted. The nature of the cracks can affect the textured appearance of the image printed onto the canvas. Thus, the textured appearance can be adjusted to fit with the image being printed onto the canvas.

FIG. 2B is a table (210) showing the chemical makeup of the transparent layer material (e.g. 108, FIG. 1). The left column (212) shows the chemical component and the right column (214) shows the parts ratio for the corresponding chemical component. According to certain illustrative examples, the transparent material includes Mowiol 40-88, Ecosurf SA-9, Cartacoat K303C, and Silwet L7605. As mentioned above, the transparent layer prevents bleeding of the ink used to form an image on the canvas.

Figure 3A:
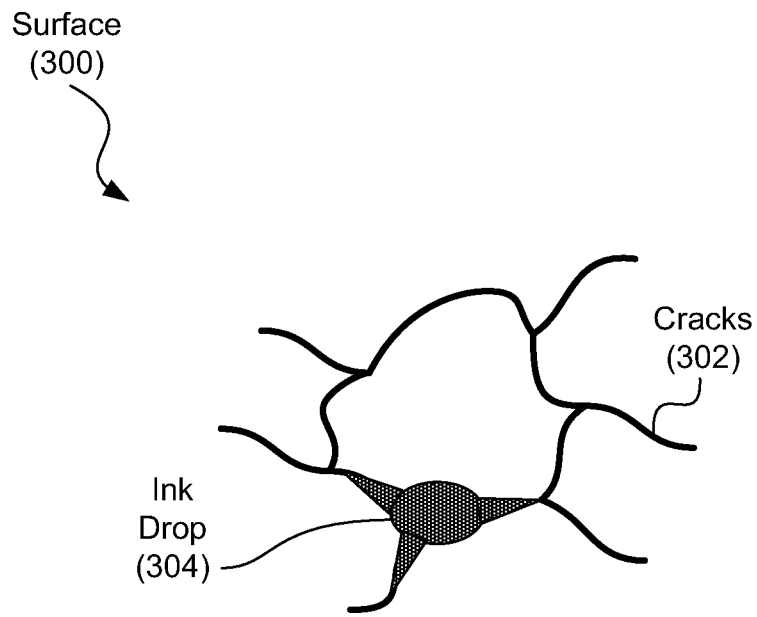
FIGS. 3A and 3B are diagrams showing how bleeding can occur due to cracks in the coating, according to one example of principles described herein.
Figure 3B:
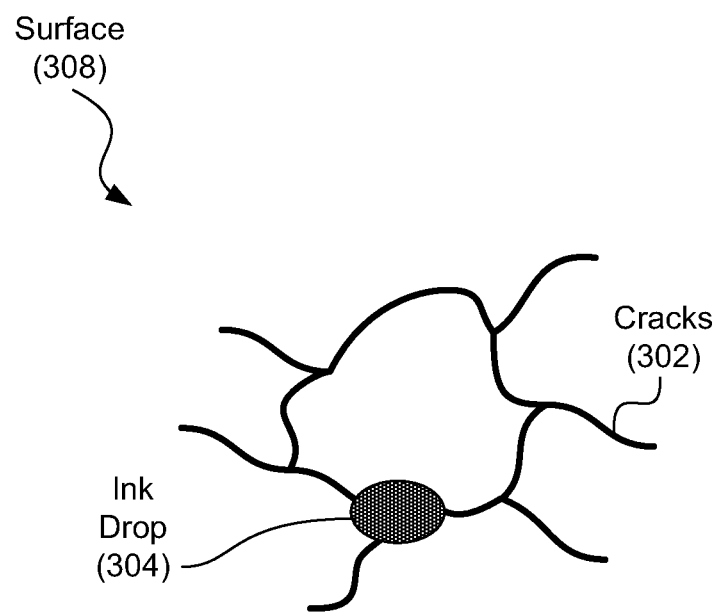

FIGS. 3A and 3B are diagrams showing how bleeding can occur due to cracks in the coating. FIG. 3A is a diagram showing an ink drop placed onto the microporous layer without a transparent material filling the cracks. FIG. 3B is a diagram showing an ink drop placed onto the microporous layer with a transparent layer filling the cracks.

When an ink drop (304) that is disposed onto the surface of the microporous layer lands on a crack (302) that is not filled in, that ink drop (304) will experience bleeding. Bleeding is when the ink spreads from its originally placed location. When the ink used to form an image bleeds, it will adversely affect the appearance of that image.

Conversely, when an ink drop (304) that is disposed on the surface (308) of a microporous layer that has a transparent coating to fill the cracks (302), that ink will not bleed. Furthermore, the characteristics of the transparent material layer are such that pigment ink particles will adhere to the surface of the layer while dye ink particles will penetrate through without causing ink bleed. Because the ink does not bleed, a better looking image is placed onto the canvas. Furthermore, because the cracks affect the way in which the ink is viewed by the human eye, the image provides a textured appearance.

Figure 4:
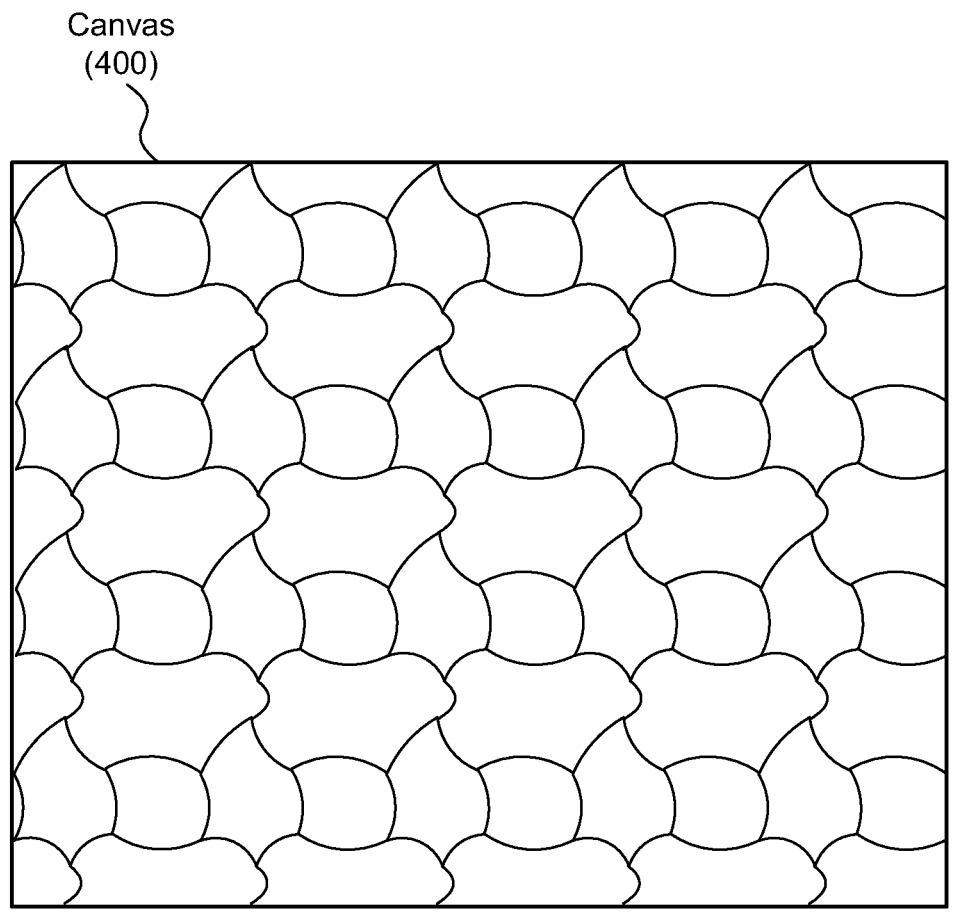
FIG. 4 is a diagram showing a surface view of an illustrative canvas with a textured appearance, according to one example of principles described herein.

FIG. 4 is a diagram showing a surface view of an illustrative canvas (400) with a textured appearance. According to certain illustrative examples, the textured appearance of the canvas (400) exhibits a uniform pattern with hexagonal or pentagonal cells. In some cases, trigonal and tetragonal cells may be formed. The cracks in the microporous layer are uniform because they form along the interstitial regions of the underlying base layer. The interstitial regions are the regions between the stitches in the weave pattern of the canvas fabric. Thus the weave pattern will affect the pattern of the uniform cracks formed along the surface of the microporous layer.

Figure 5:
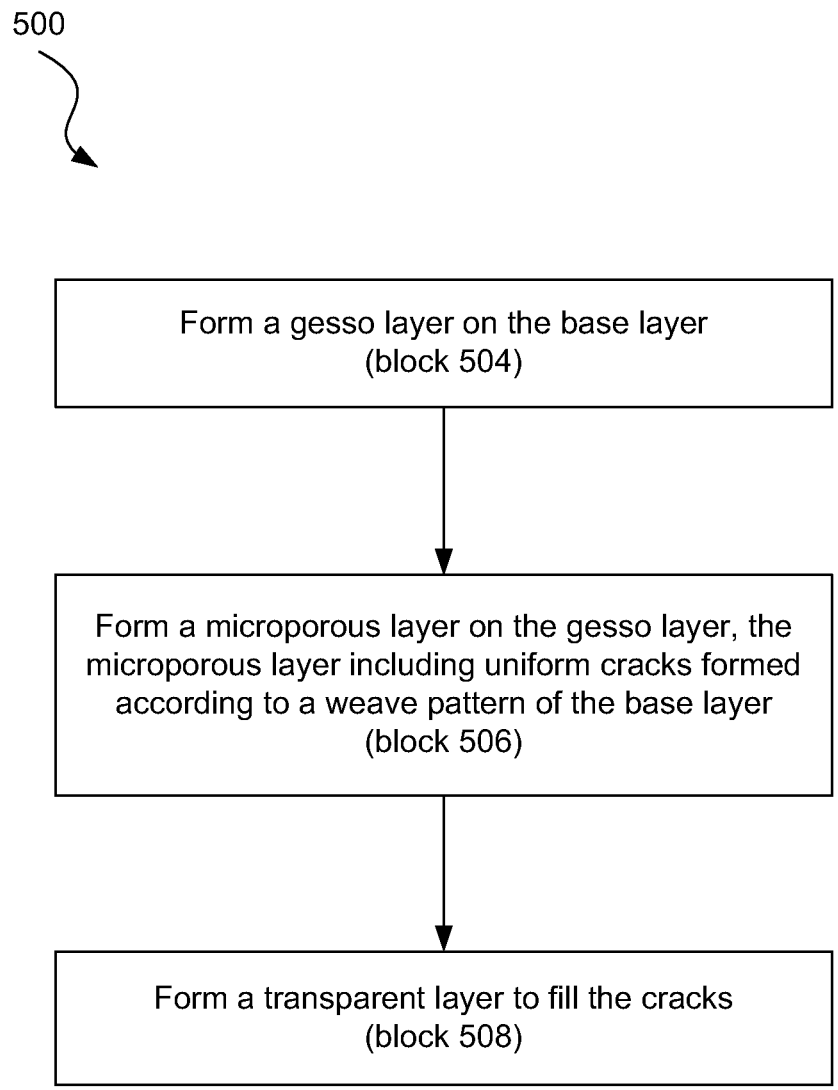
FIG. 5 is a flowchart showing an illustrative method for forming a canvas with a textured appearance, according to one example of principles described herein.

FIG. 5 is a flowchart showing an illustrative method for forming a canvas with a textured appearance. According to certain illustrative examples, the method includes forming (block 504) a gesso layer on a base layer, forming (block 506) a microporous layer on the gesso layer, the microporous layer comprising uniform cracks formed according to a weave pattern of the base layer, and forming (block 508) a transparent layer to fill the cracks.

In conclusion, through use of a canvas embodying principles described herein, an electronically stored image can be printed onto a canvas using traditional printing methods such as ink jet. Due to the uniform cracking along the interstitial regions, the printed image will have a textured appearance. This can be useful, for example, when printing electronic images of classical paintings. These paintings will be printed onto a canvas and a textured look may still be exhibited.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A canvas comprising:
   a base layer;
   a gesso layer on said base layer;
   a microporous layer on said gesso layer, said microporous layer comprising uniform cracks formed according to a weave pattern of said base layer; and
   a transparent layer to fill said cracks.

2. The canvas of claim 1, wherein said cracks are formed within regions corresponding to interstitial regions of said base layer.

3. The canvas of claim 1, in which said microporous layer comprises an amount of cross-linker material chosen to affect an appearance of said cracks.

4. The canvas of claim 3, in which said cross-linker material comprises boric acid.

5. The canvas of claim 1, further comprising a marking fluid layer comprising an image formed onto said transparent layer.

6. The canvas of claim 1, in which said cracks form one of trigonal, tetragonal, pentagonal and hexagonal shapes.

7. The canvas of claim 1, in which said microporous layer comprises an amount of cross-linker material to allow formation of said cracks due to the weave pattern of said base layer.

8. A method of forming a textured appearing canvas comprising
   forming a gesso layer on a base layer;
   forming a microporous layer on said gesso layer, said microporous layer comprising uniform cracks formed according to a weave pattern of said base layer; and
   forming a transparent layer to fill said cracks.

9. The method of claim 8, in which said cracks are formed within regions corresponding to interstitial regions of said base layer.

10. The method of claim 8, in which said microporous layer comprises a cross-linker material to affect an appearance of said cracks.

11. The method of claim 8, further comprising a marking fluid layer comprising an image formed onto said transparent layer.

12. The method of claim 8, in which said cracks form one of trigonal, tetragonal, pentagonal and hexagonal shapes.

13. The method of claim 8, further comprising:
   determining a desired nature of the cracks based on an image to be printed on said canvas; and
   adjusting an amount of cross-linker material in the microporous layer based on the desired nature of the cracks to be formed.

14. The method of claim 8, further comprising providing the microporous layer with an amount of cross-linker material to allow formation of said cracks along the weave pattern of said base layer.

15. The method of claim 10, in which an amount of said cross-linker material in said microporous layer ranges from 0.5 parts to 3.0 parts per 100 parts of a pigment within said microporous layer.

16. The method of claim 10, in which said cross-linker material comprises boric acid.

17. The method of claim 15, in which said amount of said cross-linker material is adjusted to alter a straightness of said cracks.

18. A canvas comprising:
   a base layer comprising a weave pattern;
   a gesso layer on said base layer;
   a microporous layer on said gesso layer, said microporous layer comprising uniform cracks formed along regions that correspond to interstitial regions of said base layer; and
   a transparent layer to fill said cracks;
   in which an appearance of said cracks is based on an amount of cross-linker material mixed in with said microporous layer.

19. The canvas of claim 18, in which said microporous layer comprises an amount of cross-linker material specifically to allow formation of said cracks that correspond to interstitial regions of said base layer.

* * * * *